US011838821B2

(12) United States Patent
Huang et al.

(10) Patent No.: US 11,838,821 B2
(45) Date of Patent: *Dec. 5, 2023

(54) MODEM AND APPLICATION INTERACTION FOR VOICE CALLS

(71) Applicant: MEDIATEK INC., Hsin-Chu (TW)

(72) Inventors: Yucheng Huang, Hsin-Chu (TW); Chun Hsu, Hsin-Chu (TW); Cheng-Yu Chen, Hsin-Chu (TW); Marko Niemi, Oulu (FI)

(*) Notice: Subject to any disclaimer, the term of this patent is extended or adjusted under 35 U.S.C. 154(b) by 0 days.

This patent is subject to a terminal disclaimer.

(21) Appl. No.: 18/148,410

(22) Filed: Dec. 29, 2022

(65) Prior Publication Data
US 2023/0134052 A1 May 4, 2023

Related U.S. Application Data

(63) Continuation of application No. 16/890,181, filed on Jun. 2, 2020, now Pat. No. 11,570,679.
(Continued)

(51) Int. Cl.
H04W 36/24 (2009.01)
H04W 36/14 (2009.01)

(52) U.S. Cl.
CPC ........... H04W 36/24 (2013.01); H04W 36/14 (2013.01)

(58) Field of Classification Search
CPC ..... H04W 36/24; H04W 36/14; H04W 88/04; H04W 36/0022; H04W 76/10; H04W 36/0055; H04W 76/19
See application file for complete search history.

(56) References Cited

U.S. PATENT DOCUMENTS

| 2018/0160461 A1 | 6/2018 | Addepalli et al. |
| 2018/0227219 A1* | 8/2018 | Zhang ................. H04W 28/085 |
| 2019/0159115 A1 | 5/2019 | Russell et al. |

FOREIGN PATENT DOCUMENTS

| WO | WO2016186685 A1 | 5/2015 |
| WO | WO2016186685 A1 | 9/2015 |

(Continued)

OTHER PUBLICATIONS

China Intellectual Property Office Action, dated Dec. 2, 2022 (7 pages).

(Continued)

Primary Examiner — Charles N Appiah
Assistant Examiner — Frank E Donado
(74) Attorney, Agent, or Firm — Helen Mao; Zheng Jin; Imperium Patent Works

(57) ABSTRACT

Methods and apparatus are provided for EPS fallback status report by the modem to the upper layers. In one embodiment, the mobile terminal (MT) initiates a 5G voice call, detects an EPSFB triggered by the wireless network, identifies one or more EPSFB status and sends one or more EPSFB status indicators to at least one upper layer based on the identified one or more EPSFB status. In one embodiment, the EPS fall back is a redirection procedure. In another embodiment, the EPS fallback is a handover procedure. In yet another embodiment, the one or more EPSFB status indictors comprising a redirection to EPS started indicator, a handover to EPS started indicator, a redirection to EPS failed indicator, a handover to EPS failed indicator, a redirection to EPS success indicator, and a handover to EPS success indicator. In one embodiment, the MT sends EPSFB status indicators using AT command.

18 Claims, 6 Drawing Sheets

Related U.S. Application Data

(60) Provisional application No. 62/870,137, filed on Jul. 3, 2019.

(56) References Cited

FOREIGN PATENT DOCUMENTS

| WO | WO2019061265 A1 | 9/2017 |
|---|---|---|
| WO | WO2019097498 | 11/2017 |
| WO | WO2019099705 A2 | 11/2017 |

OTHER PUBLICATIONS

EPO, search report for the EP patent application 20183694.7 dated Nov. 20, 2020 (12 pages).

3GPP TS 36.523-1 V15.5.0 (Feb. 19, 2003), "10 EPS session management", 3rd Generation Partnership Project *paragraph [13.1.3]; tables 13.1.3.3.2-3*.

3GPP TSG-SA WG2 Meeting #126 S2-181637, Ericsson et al., "EPS Fallback for Voice", Montreal, Canada, Feb. 26-Mar. 2, 2018 (10 pages) *paragraph [4.13.X]*.

3GPP TS 27.007 V16.2.0 (Sep. 2019) 3rd Generation Partnership Project; Technical Specification Group Core Network and Terminals; AT command set for User Equipment (US) (Release 16) *paragraph [08.1]*.

3GPP TSG-CT WG1 Meeting #119 C1-195117 (was C1-194662), MediaTek Inc. et al., "EPS fallback status +CEPSFBS", Wroclaw, Poland, Aug. 26-30, 2019 (10 pages).

Taiwan IP Office prepared search report and written opinion for patent application 109121999 dated Aug. 31, 2021 (6 pages).

Indian IP Office prepared seaerch report and written opinion for patent application 202024026579, dated Aug. 30, 2021 (6 pages).

10 EPS session management publication data: 3GPP draft; 36523-1-f50_s10-s13, Apr. 17, 2019 3GPP, mobile competence centre; 650, route des Lucioles; F-06921 Sophia-Antipolis Cedex; France, section 13.1.3.

\* cited by examiner

| COMMAND | POSSIBLE RESPONSE(S) |
|---|---|
| +CEPSFB=[<reporting>] | +CME ERROR: <err> |
| +CEPSFB? | +CEPSFB: <reporting>,<stat>,<type> |
| +CEPSFB=? | +CEPSFB: (list of supported <reporting>s) |

US 11,838,821 B2

MODEM AND APPLICATION INTERACTION FOR VOICE CALLS

CROSS REFERENCE TO RELATED APPLICATIONS

This application is a continuation, and claims priority under 35 U.S.C. § 120 from nonprovisional U.S. patent application Ser. No. 16/890,181, entitled "MODEM AND APPLICATION INTERACTION FOR VOICE CALLS", filed on Jun. 2, 2020, the subject matter of which is incorporated herein by reference. application Ser. No. 16/890, 181, in turn, claims priority under 35 U.S.C. § 119 from U.S. Provisional Application No. 62/870,137, entitled "Improvements to Modem and Application interaction for voice calls," filed on Jul. 3, 2019. The disclosure of each of the forgoing documents is incorporated herein by reference.

TECHNICAL FIELD

The disclosed embodiments relate generally to wireless communication, and, more particularly, to modem and application interaction for voice calls.

BACKGROUND

The wireless cellular communications network has grown exponentially over the years. The fifth-generation system (5GS) is developed to meet the increasing demand for wireless services. The 5GS provides higher speed data services. Voice services and its development and evolution in the era of 5G is also a key component in the evolving wireless network. The 5GS utilizes new radio (NR) access technology. The 5GS provides voice over NR (VoNR) for voice services. 5G will also continue to utilize 4G voice architecture and the IP multimedia subsystem (IMS) to provide voice services. For 4G wireless access we have LTE networks, and its voice service VoLTE.

Certain 5GS networks offer the VoPS over 3GPP by evolved packet system (EPS) fallback (EPSFB). When the UE initiates IMS voice call on those networks, the 5GS network starts EPS fallback procedure for the UE and the UE has no control over it. If the EPSFB fails for some reason the UE may stay at the NR 5GS. The UE, especially the upper layers of the UE, does not know that EPSFB was attempted and failed. Similarly, if the EPSFB succeeds and UE connects to the LTE 4G network but fails to setup the voice call, the UE, especially the upper layers of the UE, does not know the EPSFB status. Normally, if the EPSFB fails or the call itself fails after EPSFB, the UE's upper layers decides in which domain to re-attempt the call. To make the most appropriate action after the EPSFB failure it would be beneficial for the upper layers to get indication whether the EPSFB failed or whether the EPSFB was successful and other EPSFB status information. Currently, there is no EPSFB information available to the upper layers of the UE.

A solution is sought for the upper layers of the UE to obtain the EPSFB status information.

SUMMARY

Methods and apparatus are provided for EPS fallback status report by the modem to the upper layers. In one embodiment, the modem/mobile terminal (MT) initiates a 5G voice call, detects an EPSFB triggered by the wireless network, identifies one or more EPSFB status and sends one or more EPSFB status indicators to at least one upper layer based on the identified one or more EPSFB status. In one embodiment, the EPS fall back is a redirection procedure. In another embodiment, the EPS fallback is a handover procedure. In yet another embodiment, the one or more EPSFB status indicators comprising a redirection to EPS started indicator, a handover to EPS started indicator, a redirection to EPS failed indicator, a handover to EPS failed indicator, a redirection to EPS success indicator, and a handover to EPS success indicator.

In one embodiment, the mobile terminal sends the one or more EPSFB status indicators using AT command. In one embodiment, the AT command is a new EPSFB status AT command comprising one or more parameters comprising an EPSFB status field, an EPSFB type field and a reporting field. In another embodiment, the EPSFB status command enables EPSFB unsolicited status report to upper layers by setting a value of the reporting field to be one. In yet another embodiment, the EPSFB status field indicates an EPSFB status comprising: 5GS to EPS fallback started, 5GS to EPS fallback successful, and 5GS to EPS fallback failed. In one embodiment, the EPSFB type field indicates an EPSFB type comprising: a handover and a redirection. In yet another embodiment, the sending one or more EPSFB status indicators is disabled upon receiving one or more disabling indication.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
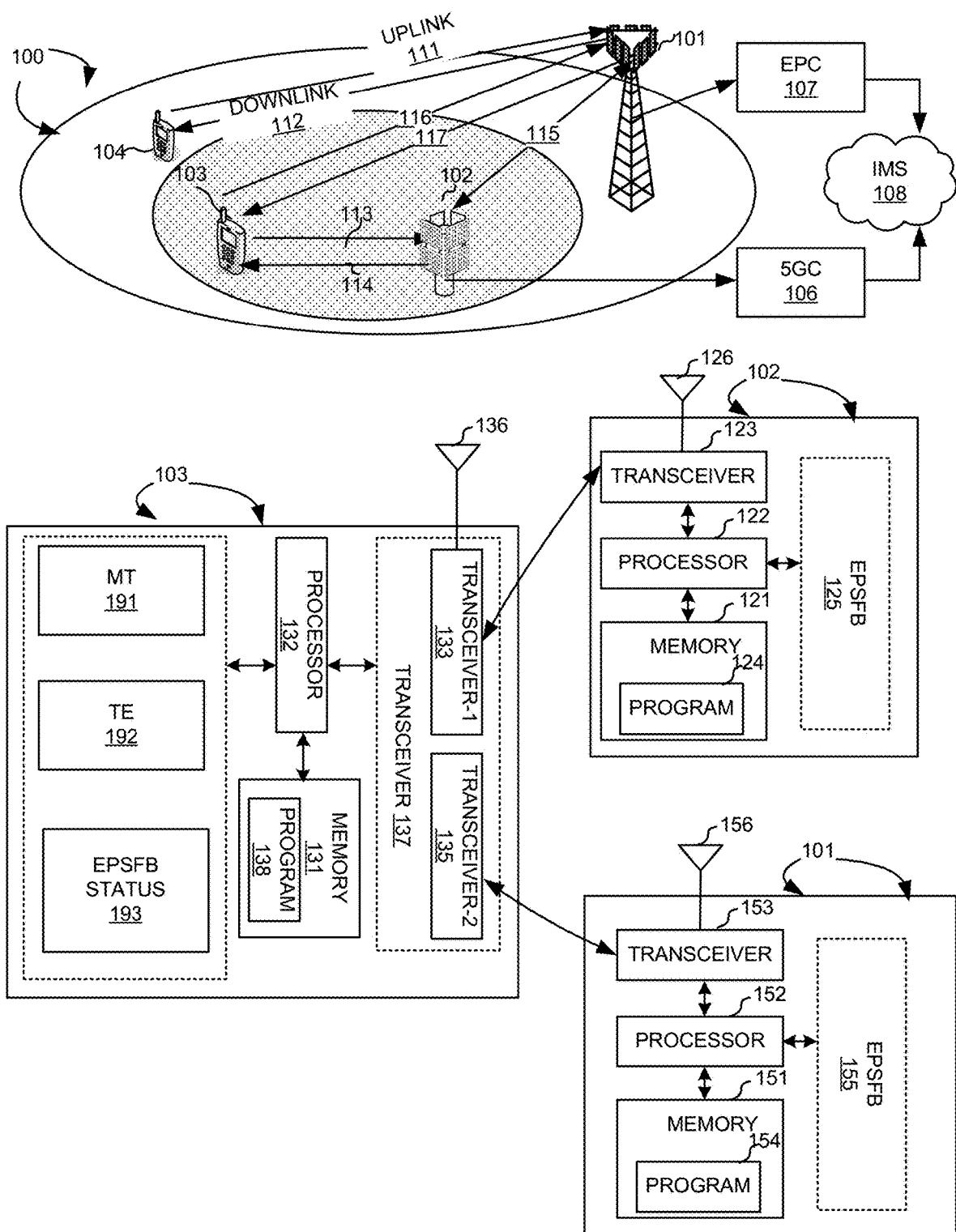
FIG. 1 illustrates an exemplary wireless network and a user equipment (UE) with EPSFB in accordance with one novel aspect.

FIG. 1 illustrates an exemplary wireless network 100 and a user equipment (UE) with EPSFB in accordance with one novel aspect. Wireless network 100 comprises 5GS network with an exemplary base station gNB 102 and an exemplary 5G core (5GC) 106, and 4G/LTE network with an exemplary base station eNB 101 and an exemplary evolved packet core (EPC) 107. Mobile stations/UEs 103 and 104 connect with the wireless network 100. UE 104 is served by eNB 101 with an uplink 111 and down link 112. UE 103 is served by gNB 102. When UE 103 is configured with dual connectivity, UE 103 is served by eNB 101 with uplink 116 and downlink 117. At the same time, UE 103 is also served by gNB 102 with uplink 113 and downlink 114. The 5GS may support IMS registration locally but it may support voice calls not locally in the 5GS but only over EPS if both the UE and network support voice over EPS. EPS fallback for voice calls can happen when the 5GS network trigger fallback to EPS or is willing to steer voice calls to EPS. The EPSFB can happen for both mobile originated and mobile terminated calls. When UE 103 initiates IMS voice call to IMS network 108, the 5GS network may initiate EPS fall back procedure. The EPSFB is controlled and triggered by the network and usually, the UE has no control over it and no way to identify when the EPSFB takes in place. In one novel aspect, the mobile terminal part of the UE detects the EPSFB status and sends it to upper layers of the UE.

FIG. 1 further illustrates simplified block diagrams for UE 103, gNB 102, and eNB 101. UE 103 has an antenna 136, which transmits and receives radio signals. An RF transceiver module 137, coupled with antenna 136, receives RF signals from antenna 136, converts them to baseband signals and sends them to processor 132. RF transceiver 137 also converts received baseband signals from processor 132, converts them to RF signals, and sends out to antenna 135. In one embodiment, RF transceiver module 137 has two transceivers, transceiver-1 133 and transceiver-2 135. Processor 132 processes the received baseband signals and invokes different functional modules to perform features in UE 103. Memory 131 stores program instructions and data 134 to control the operations of UE 103.

For external applications, the EPSFB status may be provided through an AT command. AT commands are used for controlling Mobile Termination (MT) functions and network services from a Terminal Equipment (TE) through Terminal Adaptor (TA). As an example, UE 103 comprises a TE, a TA, and an MT. TE can use AT commands to control MT to get EPSFB status information. In accordance with one novel aspect, a new AT command interface that can report EPSFB status to the TE is proposed. The EPSFB status information can be provided by the MT to the TE automatically upon enabled. The EPSFB status can be queried by the TE through AT command as well. The report of the EPSFB status can be disabled through AT command as well.

UE 103 also includes multiple modules that carry out different tasks in accordance with embodiments of the current invention. Mobile terminal (MT) 191 initiates a 5G voice call in wireless network 100, detects an evolved packet system (EPS) fallback (EPSFB) triggered by IMS 108, identifies one or more EPSFB status, and sends one or more EPSFB status indicators to at least one upper layer based on the identified one or more EPSFB status. Terminal equipment (TE) 192 receives EPSFB status from MT 191 and determines voice call status for UE 103. EPSFB status module 193 handles EPSFB status information. EPSFB status module 193 may be part of MT 191 or part of TE 192 or a standalone module. The UE modules can be implemented in software, firmware, or hardware/circuits. In another embodiment, EPSFB status module 193 may distribute its function in both MT 191 and TE 192.

Also shown in FIG. 1 is an exemplary block diagram for eNB 101. eNB 101 has an antenna 156, which transmits and receives radio signals. A RF transceiver module 153, coupled with the antenna, receives RF signals from antenna 156, converts them to baseband signals and sends them to processor 152. RF transceiver 153 also converts received baseband signals from processor 152, converts them to RF signals, and sends out to antenna 156. Processor 152 processes the received baseband signals and invokes different functional modules to perform features in eNB 101. Memory 151 stores program instructions and data 154 to control the operations of eNB 101. eNB 101 also includes multiple function modules that carry out different tasks in accordance with embodiments of the current invention. An EPSFB 155 handles communication with UE 103 for EPSFB and performs EPSFB procedure.

Also shown in FIG. 1 is an exemplary block diagram for gNB 102. gNB 102 has an antenna 126, which transmits and receives radio signals. An RF transceiver module 123, coupled with the antenna, receives RF signals from antenna 126, converts them to baseband signals and sends them to processor 122. RF transceiver 123 also converts received baseband signals from processor 122, converts them to RF signals, and sends out to antenna 126. Processor 122 processes the received baseband signals and invokes different functional modules to perform features in gNB 102. Memory 121 stores program instructions and data 124 to control the operations of gNB 102. gNB 102 also includes multiple function modules that carry out different tasks in accordance with embodiments of the current invention. An EPSFB 125 handles communication with UE 103 for EPSFB and performs the EPSFB procedure.

In one novel aspect, the EPSFB status is indicated to the upper layer such that the upper layers can decide in which domain to re-attempt the call if the EPSFB failed. In one embodiment, the modem/mobile terminal (MT) provides the upper layers with an indication information about the status of the EPSFB procedure.

Figure 2:
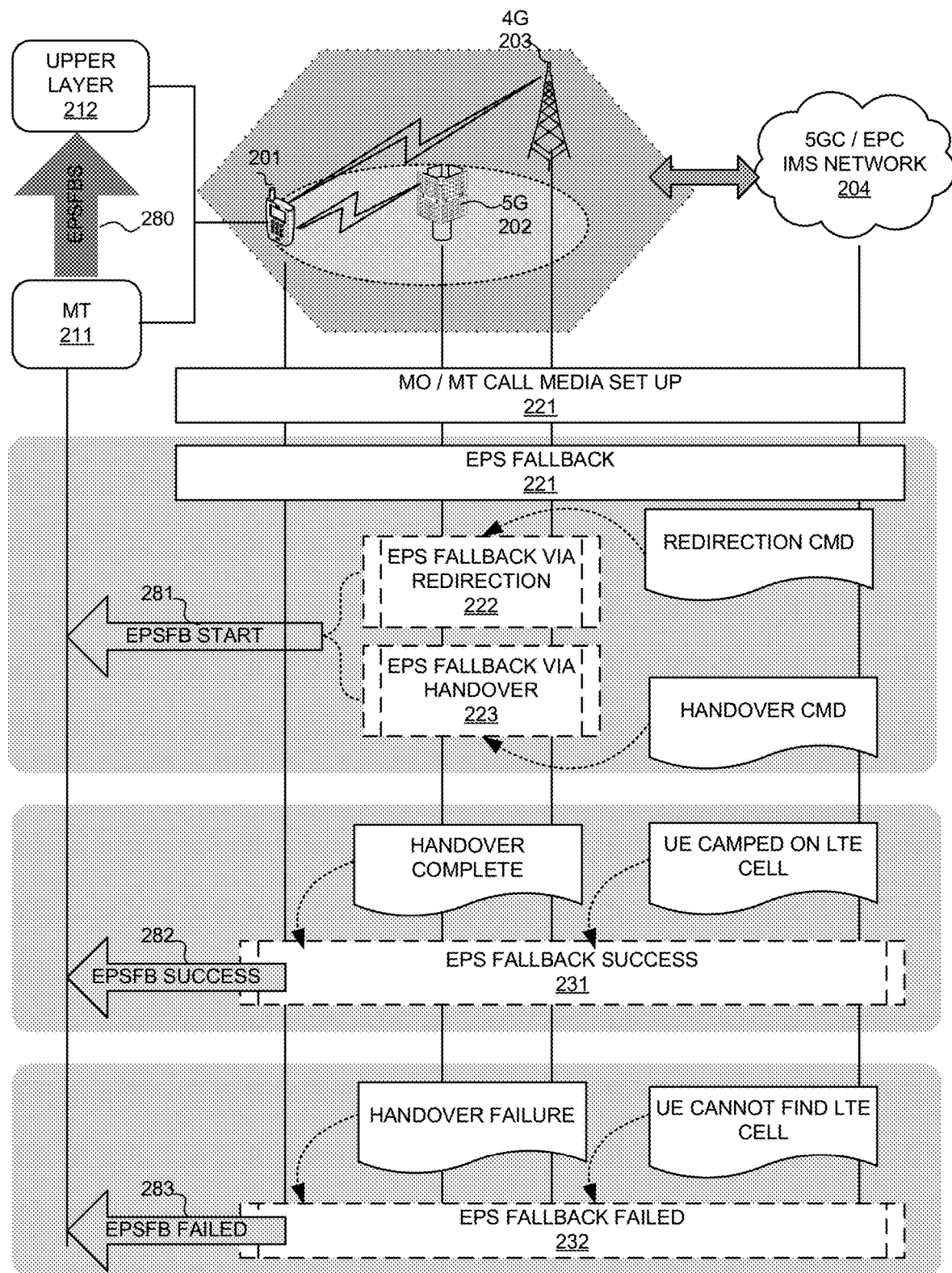
FIG. 2 illustrates an exemplary block diagram of the EPSFB status report by the mobile terminal in accordance with embodiments of the current invention.

FIG. 2 illustrates an exemplary block diagram of the EPSFB status report by the mobile terminal in accordance with embodiments of the current invention. A UE 201 is connected in a 5GS network. UE 201 connects with a 5G radio access station/gNB 202 and a 4G/LTE base station/eNB 203. The 5GS network also includes network entities 204, including 5GC, EPC and IMS. At step 221, UE 201 starts a mobile originated (MO) or a mobile terminated (MT) call and proceeds with media set up. At step 221, the wireless network initiated an EPS procedure. In one embodiment, the EPSFB procedure is carried out with a redirection procedure at step 222. In the redirection procedure for EPSFB case, UE 201 releases the call with 5G gNB 202 and re-establishes link with LTE/eNB 203, where a new radio connection is started for the VoLTE call. In one embodiment, MT 211 identifies the EPSFB starts with redirection by detecting the redirection command. In one embodiment, the redirect command is "Connection Release Command" with Redirection information received on NR during MO/MT procedure. In another embodiment, the EPSFB procedure is carried out with a handover procedure at step 223. In the handover procedure for the EPSFB case, UE 201 performs handover from the 5GC to EPC while maintaining the connection with the original 5G gNB. In one embodiment, MT 211 identifies the EPSFB starts with handover by detecting a handover command indicating EPS fallback procedure started. In one novel aspect, MT 211 of UE 201 obtains the EPSFB status information and sends the status indication information to one or more upper layers of UE 201. At step 281, upon EPSFB starts, the EPSFB start indicator is obtained by MT 211. At step 280, the EPSFB start indicator is sent to upper layers 212 of UE 201.

Once the network triggers the EPSFB, either through redirection procedure or the handover procedure, the status of the EPSFB needs to be indicated to the upper layers of the UE. At step 231, the EPSFB procedure succeeds. At step 282, MT 211 obtains the EPSFB success information and sends the EPSFB success indicator to upper layers 212 at step 280. In one embodiment, the MT identifies the EPSFB via handover is successful by detecting a handover complete. In another embodiment, the MT identifies the EPSFB via redirection is successful by detecting UE camped on LTE. Similarly, if at step 232, the EPSFB fails, MT 211 obtains the EPSFB fail information at step 283 and sends the EPSFB fail indicator to upper layer 212 at step 280. In one embodiment, the MT identifies the EPSFB fail by detecting a handover failure. In another embodiment, the MT identifies an EPSFB fail by detecting that the UE cannot find LTE cell.

MT 211 of UE 201 is the modem of UE 201. It provides the upper layers with an indication or a set of information about the status of the EPSFB procedure, as in step 280. When the application has initiated an IMS call, the modem will provide application layer or the upper layers EPSFB indicators including a redirection to EPS started indicator, a handover to EPS started indicator, a redirection to EPS failed indicator, a handover to EPS failed indicator, a redirection to EPS success indicator, and a handover to EPS success indicator. In one embodiment, the indication to application/upper layers can be provided by AT-commands or related methods.

Figure 3:
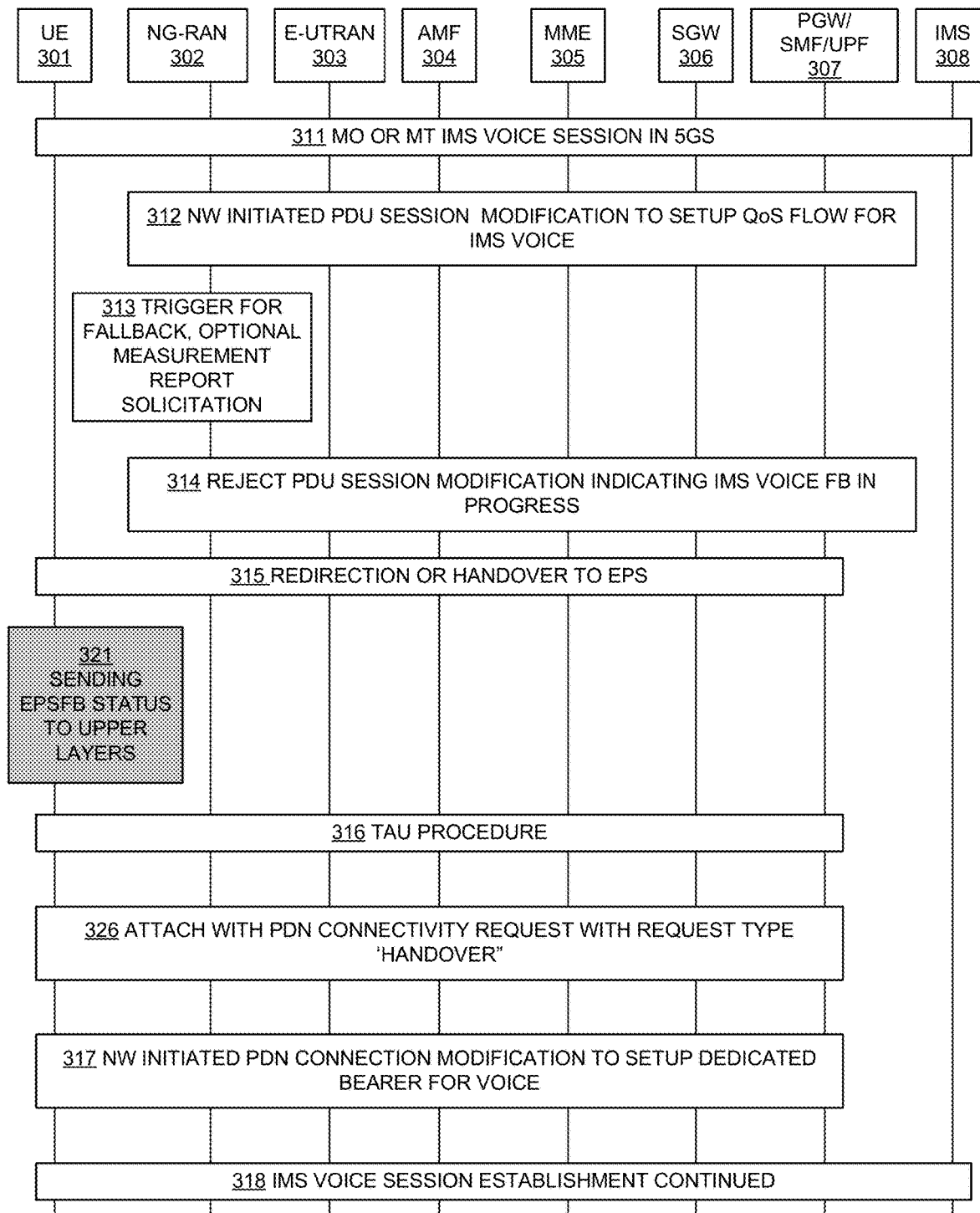
FIG. 3 illustrates an exemplary diagram for EPS falback form IMS voice when the EPSFB status indication is sent to upper layers in accordance with embodiments of the current invention.

FIG. 3 illustrates an exemplary diagram for EPS fallback form IMS voice when the EPSFB status indication is sent to upper layers in accordance with embodiments of the current invention. UE 301 is connected in the wireless network with 5GS and LTE networks. The wireless network includes next generation radio access network (NG-RAN) 302, which provides both NR and LTE radio access; evolved UTRAN (E-TRAN) 303; access mobility management function (AMF) 304, mobility management entity (MME) 305, serving gateway (SGW) 306, packet data network gateway (PGW)/session management function (SMF)/user plane function (UPF) 307, and IMS 308. At step 311, the UE starts MO or MT IMS voice session in 5GS. At step 312, the network initiates PDU session modification to setup QoS flow for IMS voice. At step 313, the 5GS radion access NG-RAN 302 triggers for EPS fallback procedure. In one embodiment, NG-RAN 302 also triggers measurement report solicitation. At step 314, the 5GS network entity PGW/SMF/UPF 307 rejects PDU session modification indicating IMS voice fallback in progress and sends the information to NG-RAN 302. At step 315, PGW/SMF-UPF 307 starts a redirection or a handover to EPS procedure and signals UE 301.

In one embodiment, the modem of the UE 301 upon detecting the EPSFB signal, at step 321, sends EPSFB status indication information to upper layers. The EPSFB status indication includes EPSFB starts, EPSFB success and EPSFB fail. At step 316, the network starts tracking area update (TAU) procedure. At step 326, the network attaches with PDN connectivity request with request type "HANDOVER". At step 317, the network initiates PDN connection modification to setup a dedicated bearer for voice. At step 318, IMS voice session establishment continues. In one novel aspect, the modem/mobile terminal identifies an EPS fallback triggered by the network. In one embodiment, the modem identifies the event at step 315 when the redirection or handover procedure is initiated. In another novel aspect, the modem identifies the status of EPS fallback triggered by the network, including EPSFB starts, EPSFB succeeded, and EPSFB failed. In another novel aspect, when there is an MT IMS call setup at step 311, the UE should wait for Network's redirection or handover command from NR to EPS to make this call on LTE at step 315.

The EPSFB status indication provided by the modem to the upper layers would enable the UE to decide in which domain to re-attempt the call or initiate a call. To make the most appropriate action after the EPSFB failure, it would be beneficial for the upper layers to get an indication of the EPSFB status. In one embodiment, the indication to application/upper lawyers is provided by the modem/mobile terminal by AT-commands.

Figures 4, 5:
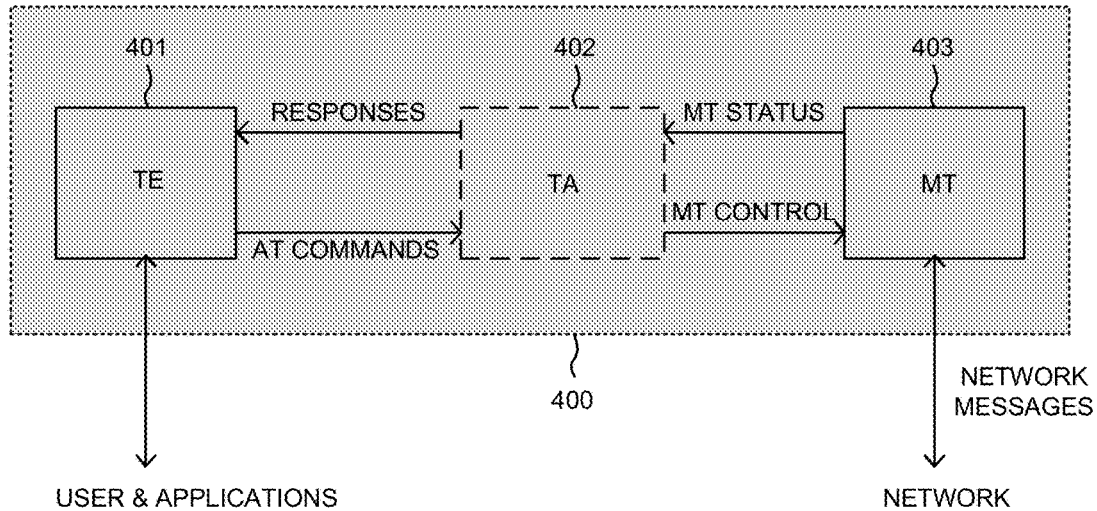
FIG. 4 illustrates a simplified block diagram of an architecture of UE comprising a Terminal Equipment (TE) and a Mobile Termination (MT) interfaced by a Terminal Adaptor (TA) in accordance with embodiments of the current invention.
FIG. 5 illustrates an exemplary table one of an AT command for EPSFB status in accordance with embodiments of the current invention.

FIG. 4 illustrates a simplified block diagram of an architecture of a user equipment UE 400 comprising a Terminal Equipment (TE 401) and a Mobile Termination (MT 403) interfaced by a Terminal Adaptor (TA 402) in accordance with embodiments of the current invention. The TA, MT, and TE may be implemented in the form of separate or integrated entities as needed. The span of control of the defined AT commands allows handling of any physical implementation that may lead to TA, MT and TE as three separate entities; TA integrated under the MT cover, and TE implemented as a separate entity; TA. integrated under the TE cover, and MT implemented as a separate entity; and TA and MT integrated under the TE cover as a single entity.

In the example of FIG. 4, the AT commands are observed on the link between TE 401 and TA 402. However, most of the AT commands exchange information about the MT, not about the TA. The Interface between TE 401 and TA 402 operates over existing serial cables, an infrared link, and all link types with similar behavior. The interface between TA 402 and MT 403 is dependent on the interference within MT 403. In one embodiment, IF 401 sends an AT command to TA 402, which converts to an MT control to be sent to MT 403. The AT commands can be a read command for retrieving EPSFB status from MT 403 or a set command for enabling or disabling automatic EPSFB status reporting for MT 403. In response, MT 403 sends EPSFB status back to TA 402, which converts to a response to be sent to IF 401. The response can include the updated EPSFB status information.

FIG. 5 illustrates an exemplary table one of an AT command for EPSFB status in accordance with embodiments of the current invention. As illustrated in FIG. 5, the AT+CEPSFB command is a set or read or test command. The set command controls the presentation of an unsolicited result code+CEPSFB: <stat>,<type> when <reporting>=1, and there is a change due to EPS fallback(EPSFB) procedure triggered by the network. Read command returns <reporting>, which indicates whether reporting of EPSFB status (EPSFBS) is enabled or disabled. When reporting is enabled, the parameters <stat> and <type> indicate the most recently received EPSFB status. When reporting is disabled, no EPSFB status is provided.

The defined values of the relevant information include:
<reporting>: integer type, <reporting>=0 disables EPSFB status unsolicited result code, <reporting>=1 enables EPSFB status data unsolicited result code +CEPSFB: <n>,<stat>,<type>.
<stat>: integer type, indicates the EPS fallback (EPSFB) status. When MO/MT call(exclude VoNR) is on-going on NR.
 "0" 5GS to EPS fallback started. ("Handover/Redirection Command" indicating EPS fallback procedure started)
 "1" 5GS to EPS fallback successful. ("Handover Complete" sent or "UE camped on LTE cell for Redirection case")
 "2" 5GS to EPS fallback fail. ("Handover Failure" sent or "UE cannot find LTE cell")
<type>: integer type; indicates the EPSFB type
 0 Handover. ("Handover Command" received on NR during MO/MT call(exclude VoNR) is on-going)
 1 Redirection. ("Connection Release Command with Redirection information" received on NR during MO/MT call(exclude VoNR) is on-going)
Implementation: Optional. This command is applicable to UEs supporting 5GS.

Figure 6:
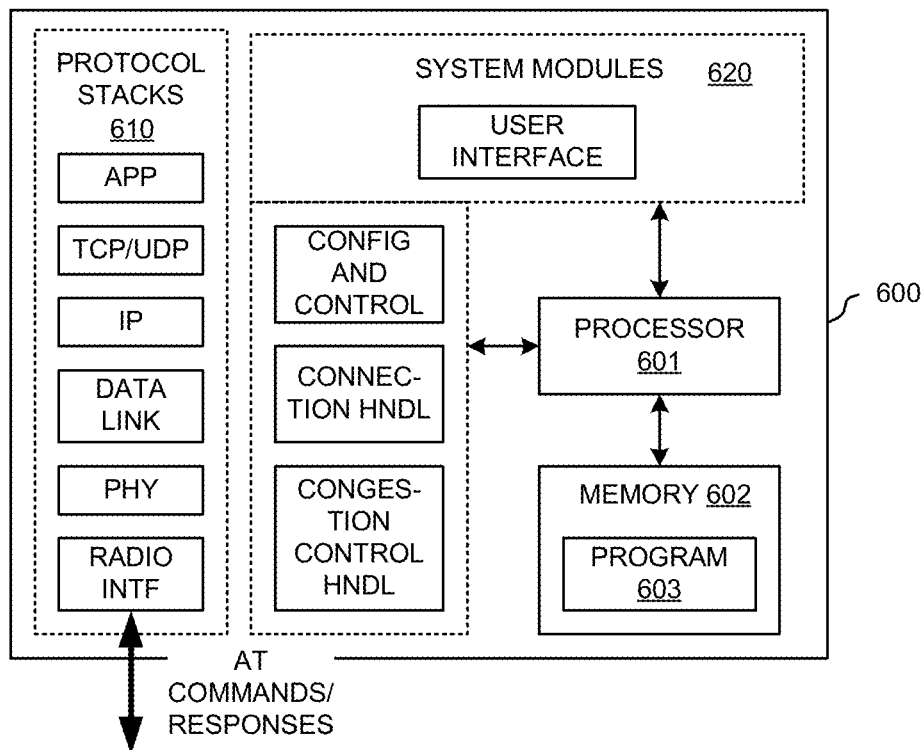
FIG. 6 illustrates a simplified block diagram of a Terminal Equipment (TE 600) with application layers that receives EPSFB status from the MT in accordance with embodiments of the current invention.

FIG. 6 illustrates a simplified block diagram of a Terminal Equipment (TE 600) with application layers that receive EPSFB status from the MT in accordance with embodiments of the current invention. TE 600 comprises a processor 601, memory 602, and protocol stacks 610, including Application (APP) layer, Transport (TCP/UDP) layer, Network (IP) layer, Data Link layer, and Physical (PHY) layer. TE 600 further comprises system control modules 620 including a user interface, a configuration and control module, a connection handler, and a congestion control handler. Processor 601 processes different applications and invokes different system control modules to perform various features of TE 600. Memory 602 stores program instructions and data 303 to control the operations of TE 600. The system control modules and circuits can be implemented and configured to carry out functional tasks of TE 600. TE 600 includes the application layers that receive EPSFB status information from the modem. In one example, TE 600 sends an AT read command to retrieve EPSFB status from the modem. In another example, TE 600 sends an AT set command to enable or disable EPSFB status reporting option. The TE 600 thus can determine whether EPSFB is applicable before sending subsequent EPSFB status related requests and parameters.

Figure 7:
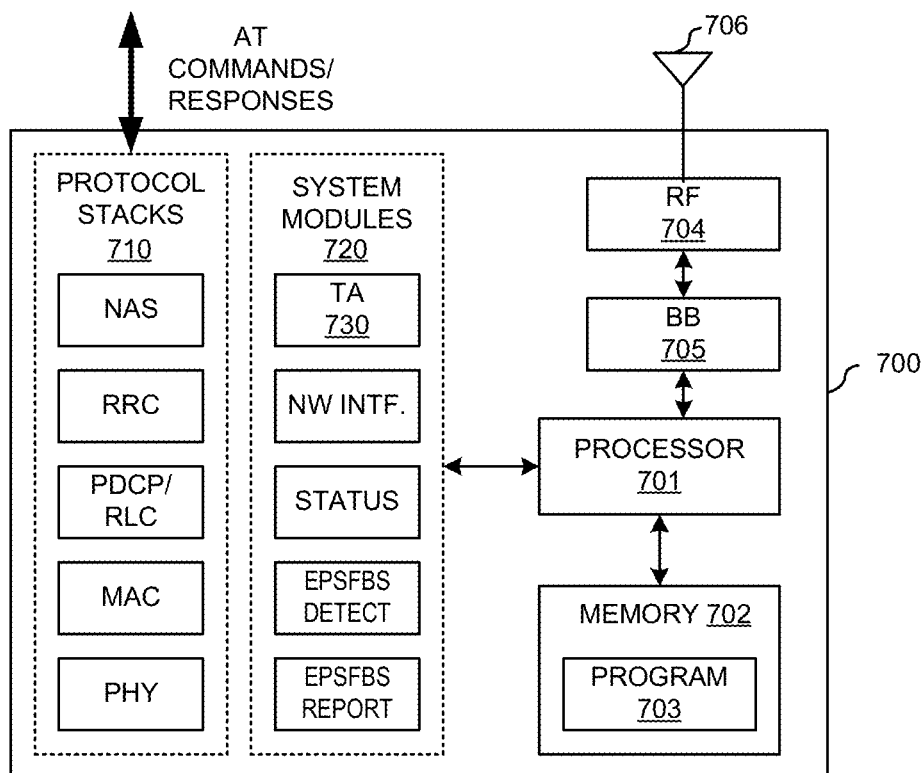
FIG. 7 illustrates a simplified block diagram of a Mobile Termination (MT 700) that sends EPSFB status to upper layers in accordance with embodiments of the current invention.

FIG. 7 illustrates a simplified block diagram of a Mobile Termination (MT 700) that sends EPSFB status to upper layers in accordance with embodiments of the current invention. MT 700 has an antenna 706, which transmits and receives radio signals. An RF transceiver module 704, coupled with the antenna, receives RF signals from antenna 706, converts them to baseband signals and sends them to processor 701 via baseband module 705. RF transceiver 704 also converts received baseband signals from processor 701 via baseband module 705, converts them to RF signals, and sends out to antenna 706. Processor 401 processes the received baseband signals and invokes different functional modules to perform features in MT 700. Memory 702 stores program instructions and data 703 to control the operations of MT 700.

MT 700 also comprises a set of protocol stacks 710 and control circuits including various system modules 720 to carry out functional tasks of MT 700. Protocol stacks 710 comprises Non-Access-Stratum (NAS) layer, Radio Resource Control (RRC) layer, Packet Data Convergence Protocol/Radio Link Control (PDCP/RLC) layer, Media Access Control (MAC) layer, and Physical (PHY) layer. System modules 720 comprises multiple function modules/circuits. A network interface circuit initiates a 5G voice call in a wireless network. A detector circuit detects an evolved EPSFB triggered by the wireless network. A status circuit identifies one or more EPSFB status. An EPSFB report circuit sends one or more EPSFB status indicators to at least one upper layer based on the identified one or more EPSFB status.

In one embodiment, MT 700 further comprises a Terminal Adaptor (TA 730) that receives and transmits AT commands and converts the AT commands to be processed by processor 701 for controlling MT functions. In another embodiment, TA may reside in TE or as a sperate entity. In one example, TA 730 receives an AT read command from a TE for the MT to retrieve EPSFB status. In another example, TA 730 receives an AT set command from a TE for setting EPSFB status reporting option such that the MT can detect EPSFB status change and report the updated EPSFB applicability status information accordingly.

Figure 8:
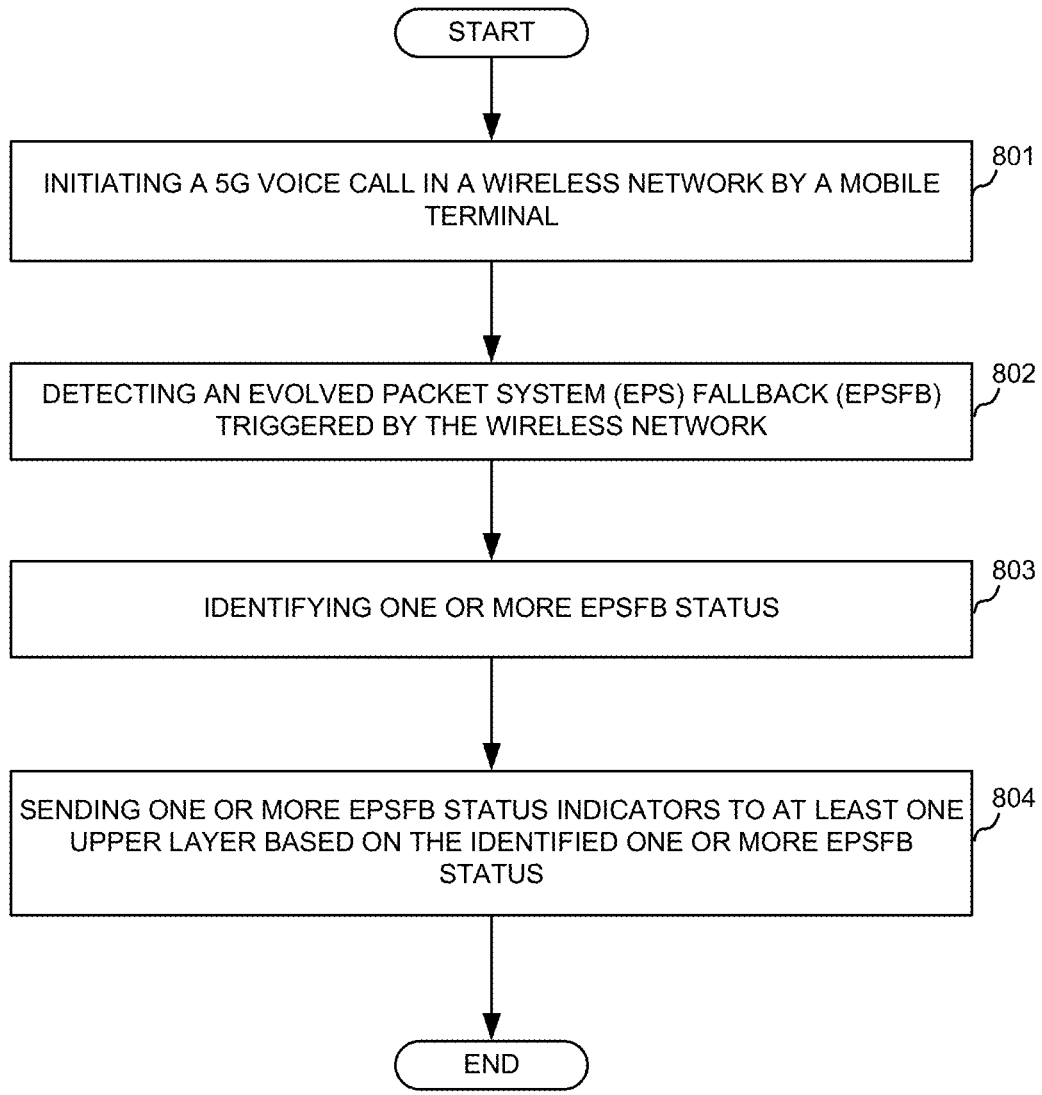
FIG. 8 illustrates an exemplary flow chart for the mobile terminal to detect and send EPSFB status indication to upper layers in accordance with embodiments of the current invention.

FIG. 8 illustrates an exemplary flow chart for the mobile terminal to detect and send EPSFB status indication to upper layers in accordance with embodiments of the current invention. At step 801, the mobile terminal initiates a 5G voice call in a wireless network. At step 802, the mobile terminal detects an evolved packet system (EPS) fallback (EPSFB) triggered by the wireless network. At step 803, the mobile terminal identifies one or more EPSFB status according to the result of step 802 or network's indicator. At step 804, the mobile terminal sends one or more EPSFB status indicators to at least one upper layer based on the identified one or more EPSFB status.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:
1. A method, comprising:
initiating a 5G voice call in a wireless network by a mobile terminal with a mobile termination (MT) functions layer;
detecting an evolved packet system (EPS) fallback (EPSFB) triggered by the wireless network;
identifying one or more EPSFB status based on a status received from the wireless network; and
sending one or more EPSFB status indicators corresponding to the one or more EPSFB status by the MT functions layer to one or more upper layers of the mobile terminal, including a terminal adaptor (TA) or a terminal equipment (TE), wherein the sending is performed in a timely manner, and the EPSFB status indicators indicate a mobile terminal status derived from the identified one or more EPSFB status, and wherein the one or more EPSFB status indicators comprise a redirection to EPS started indicator, a handover to EPS started indicator, a redirection to EPS failed indicator, a handover to EPS failed indicator, a redirection to EPS success indicator, and a handover to EPS success indicator, enabling the mobile terminal to make appropriate timely actions concerning the 5G voice call.

2. The method of claim 1, wherein the EPS fallback is a redirection procedure.

3. The method of claim 1, wherein the EPS fallback is a handover procedure.

4. The method of claim 1, wherein the mobile terminal sends the one or more EPSFB status indicators using an AT command.

5. The method of claim 4, wherein the AT command comprises one or more parameters comprising an EPSFB status field, an EPSFB type field and a reporting field.

6. The method of claim 5, wherein the AT command enables EPSFB unsolicited status report to upper layers by setting a value of the reporting field to be one.

7. The method of claim 5, wherein the EPSFB status field indicates an EPSFB status comprising: 5GS to EPS fallback started, 5GS to EPS fallback successful, and 5GS to EPS fallback failed.

8. The method of claim 5, wherein the EPSFB type field indicates an EPSFB type comprising: a handover and a redirection.

9. The method of claim 1, wherein the sending one or more EPSFB status indicators is disabled upon receiving one or more disabling indication.

10. A Mobile Termination (MT) comprising:
a network interface circuit that initiates a 5G voice call in a wireless network;
a detector circuit that detects an evolved packet system (EPS) fallback (EPSFB) triggered by the wireless network;
a status circuit that identifies one or more EPSFB status based on a status received from the wireless network; and
an upper layer circuit that sends one or more EPSFB status indicators corresponding to the one or more EPSFB status by the MT functions layer to one or more upper layers of the mobile terminal, including a terminal adaptor (TA) or a terminal equipment (TE), wherein the sending is performed in a timely manner, and the EPSFB status indicators indicate a mobile terminal status derived from the identified one or more EPSFB status, and wherein the one or more EPSFB status indicators comprise a redirection to EPS started indicator, a handover to EPS started indicator, a redirection to EPS failed indicator, a handover to EPS failed indicator, a redirection to EPS success indicator, and a handover to EPS success indicator enabling the mobile terminal to make appropriate timely actions concerning the 5G voice call.

11. The MT of claim 10, wherein the EPS fallback is a redirection procedure.

12. The MT of claim 10, wherein the EPS fallback is a handover procedure.

13. The MT of claim 10, wherein the mobile terminal sends the one or more EPSFB status indicators using AT command.

14. The MT of claim 10, wherein the AT command is a new EPSFB status AT command comprising one or more parameters comprising an EPSFB status field, an EPSFB type field and a reporting field.

15. The MT of claim 14, wherein the EPSFB status command enables EPSFB unsolicited status report to upper layers by setting a value of the reporting field to be one.

16. The MT of claim 14, wherein the EPSFB status field indicates an EPSFB status comprising: 5GS to EPS fallback started, 5GS to EPS fallback successful, and 5GS to EPS fallback failed.

17. The MT of claim 14, wherein the EPSFB type field indicates an EPSFB type comprising: a handover and a redirection.

18. The MT of claim 10, wherein the sending one or more EPSFB status indicators is disabled upon receiving one or more disabling indication.

* * * * *